Figure 1:
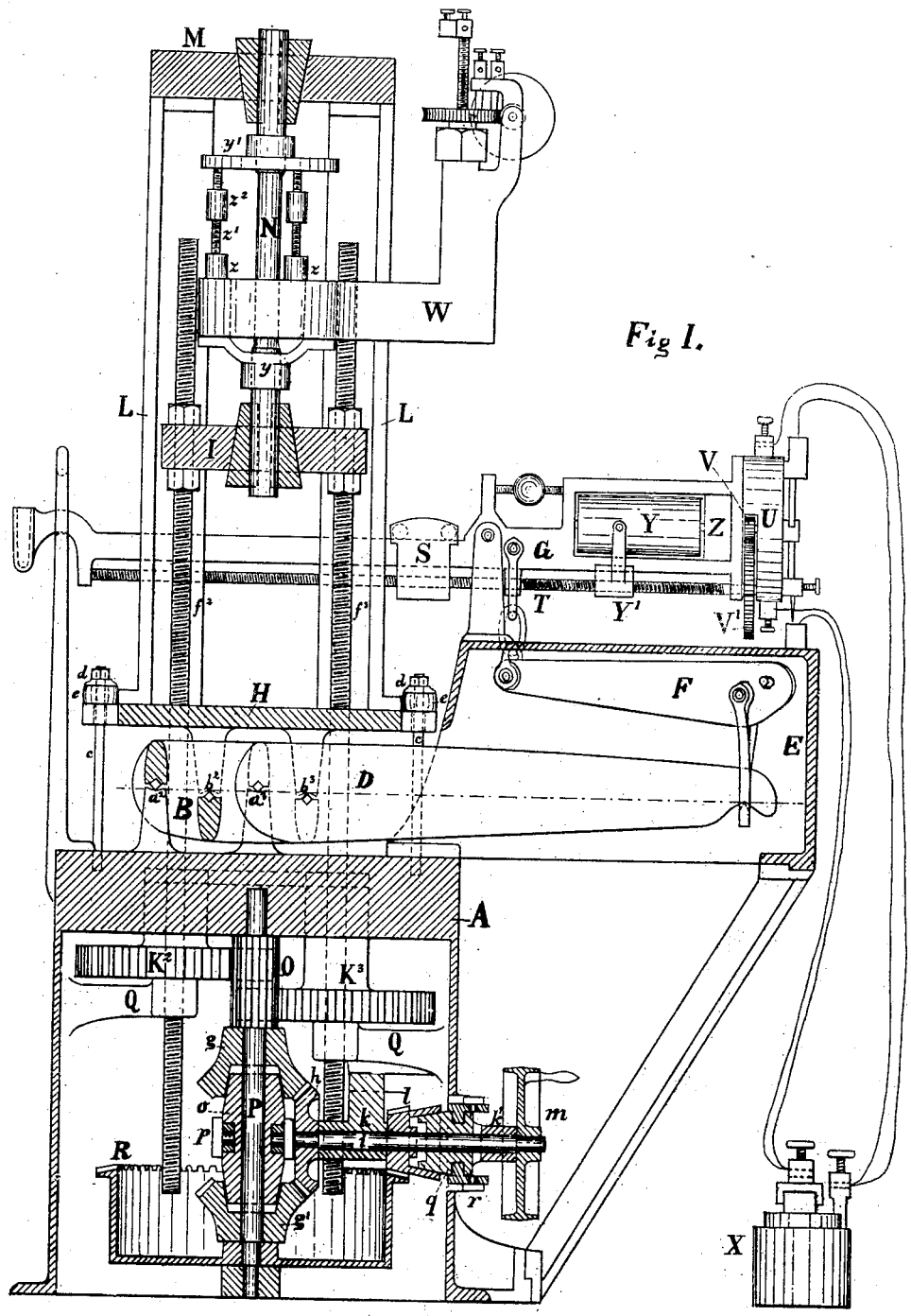

T. OLSEN.
Testing-Machine.

No. 228,214.   Patented June 1, 1880.

Witnesses:
Chr. Encke
C. J. Olsen

Inventor:
Tinius Olsen

3 Sheets—Sheet 2.
T. OLSEN.
Testing-Machine.
No. 228,214. Patented June 1, 1880.
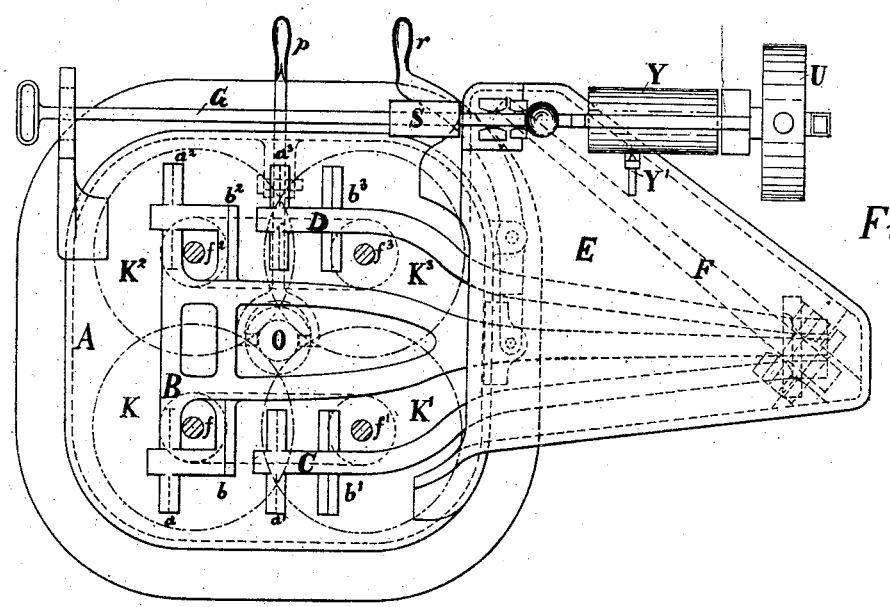
Fig. II.
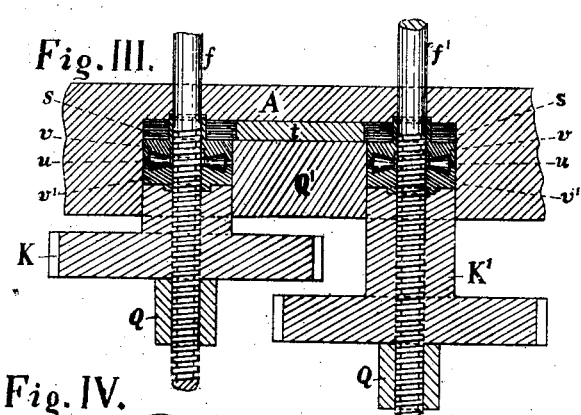
Fig. III.
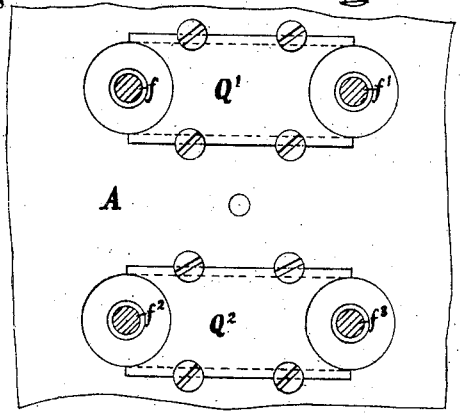
Fig. IV.
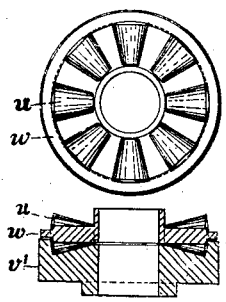
Fig. V.
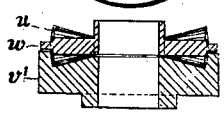
Fig. VI.
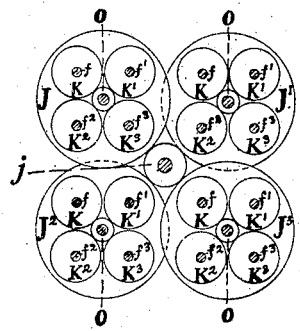
Fig. VII.
Witnesses:
Chr. Encke.
C. Y. Olsen
Inventor:
Tinius Olsen T. OLSEN.
Testing-Machine.
No. 228,214. Patented June 1, 1880.
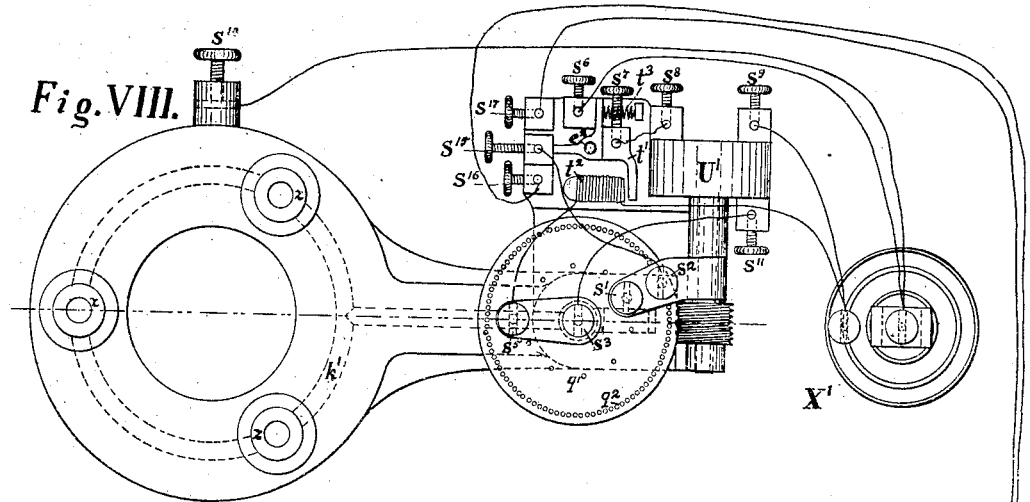
Fig. VIII.
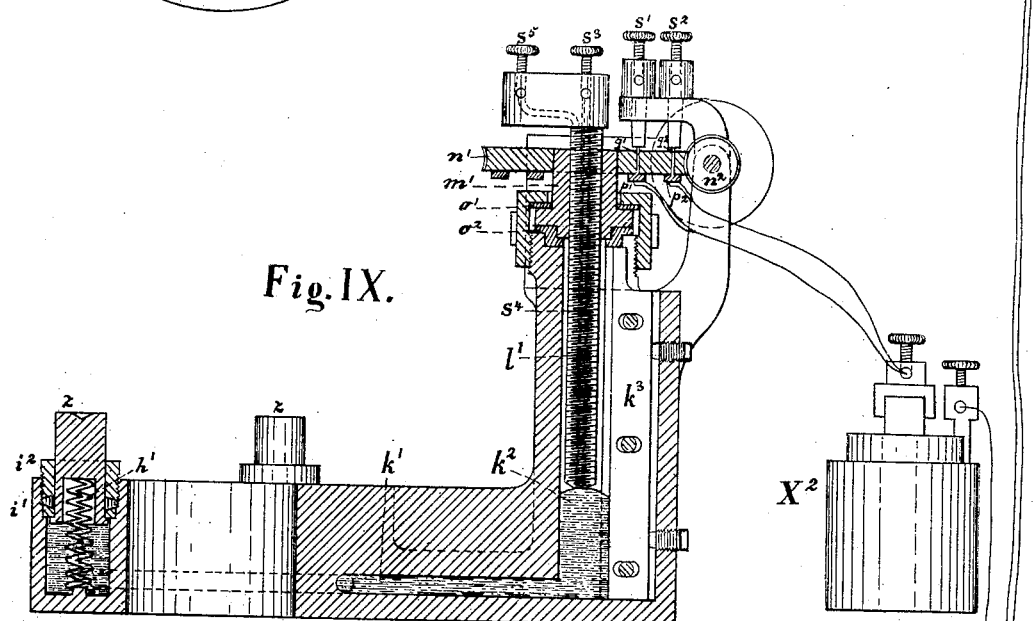
Fig. IX.
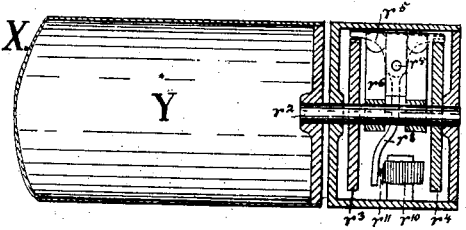
Fig. X.
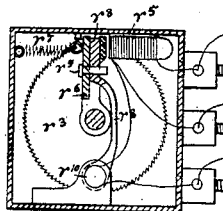
Fig. XI.
Witnesses:
Inventor:
Tinius Olsen

UNITED STATES PATENT OFFICE.

TINIUS OLSEN, OF PHILADELPHIA, PENNSYLVANIA.

TESTING-MACHINE.

SPECIFICATION forming part of Letters Patent No. 228,214, dated June 1, 1880.

Application filed February 6, 1880.

*To all whom it may concern:*

Be it known that I, TINIUS OLSEN, of Philadelphia, State of Pennsylvania, have invented a new and useful Improvement in Testing-Machines, of which the following is a specification.

The improvement relates to the means for applying stress, the mode of weighing same, as well as the means of measuring and recording the distortion of the specimens.

Heretofore such machines have, as means for applying stress on specimens, been provided either with a hydraulic jack and pumps, or provided with screws, worm-wheels, and worms. The first is objectionable in many cases on account of difficulties in holding the pressure, and the latter is objectionable for the reason that the greatest part of the applied power is wasted in friction of the worms and worm-wheels.

The object of my invention is, first, to so construct the weighing-levers that a greatly-reduced amount of space and material for the frame-work is needed.

The object is, further, to provide a system of screws and gears which will considerably decrease the amount of power absorbed by friction and occupy little room.

The object is, still further, to provide an automatic motion for the weight on the beam, so that the operator need not touch the weighing-beam in the act of making a test.

The object is, finally, to provide a sensitive measuring apparatus for measuring the distortion of the specimen, as well as an apparatus for graphically recording and illustrating same distortion, and thereby facilitate the observation of the quality of the material.

The invention consists in the arrangement of the main weighing-levers in such a manner that all the main bearings attain the nearest possible proximity to each other.

It also consists in the arrangement of a set of spring-checks for the free and movable part of the machine, preventing jumping and jarring of those parts which cannot be secured.

It further consists in the arrangement of smaller screws in one or more sets, each set of screws operated by a corresponding set of gear-wheels and pinions, both in connection, supported on equalizing-bearings in the frame-work.

It also further consists in the arrangement of an electric motor in connection with a set of gears and screw for moving the weight on the weighing-beam; and it finally consists in the arrangement of an electric micrometric measuring-instrument for measuring the elongation or contraction of specimens, and also communicating and graphically recording same while the test is being made.

In the accompanying drawings, in which similar letters of reference indicate like parts, Figure I is a vertical longitudinal section through the device embodying my invention; Fig. II, a plan of same with the top removed, and showing the arrangement of levers and gears; Fig. III, a section through the frame-work, showing, in detail, the bearings for the nuts of the screws and the pressure-equalizing device; Fig. IV, a plan of same; Fig. V, a detail view of the friction-rolls for the step-bearing; Fig. VI, a cross-section through same; Fig. VII, a diagram of arrangement of multiple sets of screws and gears; Fig. VIII, a detail plan of the measuring and transmitting instrument; Fig. IX, a vertical section through same; Fig. X, a longitudinal, and Fig. XI a cross, section of details of the arrangement for giving rotary motion to the recording-drum.

On top of the hollow frame A, Figs. I and II, are mounted the main levers B, C, and D. An additional bracket, E, secured to frame A, supports the intermediate lever F and weighing-beam G. Said main levers rest, by pivot-edges $a$, $a'$, $a^2$, and $a^3$, as commonly used for scale-levers, on projecting supports from the frame A. By other pivot-edges, $b$, $b'$, $b^2$, and $b^3$, the said levers support the table H.

By reference to Fig. II it will be seen that each of the side main levers C and D is curved outward adjacent to the end on which its pivot-edges are placed, so that a longitudinal center line passing through said pivot-edges coincides with a longitudinal center line passing through the pivot-edges on one side of the central main beam, B, all the pivot-edges of the three main beams and the table H being by this arrangement disposed in the same horizontal plane and on each side of two longitudinal center lines, each of which is located as close as practicable to two of the pulling or straining rods, hereinafter to be described.

From table H are raised four posts or columns, L, which support the cross-head M, in which the upper end of specimen N for tensile test is secured. From the frame A extend, and are to the same firmly secured, two or more rods, c, which pass freely through table H. Said rods are provided, at their ends above the table, with nuts and washers d. Between the washers and top of the table are placed pieces of elastic material or springs e. This will allow vertical motion to the table, but prevent the same from jumping or jarring too much by the breaking of the specimen. The said springs may be placed between the frame A and the table H without altering the effect.

From and secured to the cross-head I, which holds the lower end of the specimen N, extend downward the screw-threaded rods $f$, $f'$, $f^2$, and $f^3$ through the table H and between the main levers B, C, and D, also through top of frame A, to four gear-wheels, K, K', K$^2$, and K$^3$, (shown by dotted circles in Fig. II,) the hubs of which are provided with screw-threads to receive the said threaded rods and act as nuts for same. In the center of said four wheels, and in gear with same, is located the pinion O on its shaft P, which is journaled in the top and bottom of frame A. The wheels K, K', K$^2$, and K$^3$ are kept up in position by brackets Q, which extend from the sides of frame A. Said brackets also embrace as guides the rods $f$, $f'$, $f^2$, and $f^3$.

On the shaft P are located the small bevel-wheels $g$ and $g'$, as well as the larger one, R, which is secured the shaft. In gear with said wheels $g$ and $g'$ is the bevel-wheel $h$, which is secured to the shaft $i$. This shaft is journaled at $k$ and $k'$ in brackets from frame A. On the shaft $i$ is also located the bevel-pinion $l$, which engages or gears into the wheel R.

On the end of the shaft $i$, outside of frame A, is located the pulley $m$, so that the machine can be run by power, and on the side of the pulley a handle, so it may be worked by hand.

On the shaft P, and between the bevel-wheels $g$ and $g'$, is a male clutch, $o$, so fitted on the shaft that it can only be freely moved up and down by the lever $p$, Fig. II, the forked end of which is seen on both sides of said clutch in Fig. I.

In the wheels $g$ and $g'$ are female clutches to suit the male clutch $o$. It is obvious that by pressing the clutch $o$ up or down on shaft P the same will receive a right or left hand motion, as the case may require. Said motions either way are the quick motions of the machine.

A slow motion for applying the stress is accomplished through the bevel-wheel R and pinion $l$ on shaft $i$, which is also provided with the male clutch $q$, to engage with a female clutch on pinion $l$. Said clutch $q$ is worked by the hand-lever $r$, Fig. II. The forked end on same can be seen on both sides of said clutch in Fig. I. By operating with this said clutch the pinion $l$ will be engaged or disengaged for driving the bevel-wheel R.

From Figs. I and II it will be observed that the main levers B, C, and D are so arranged that all the main pivots are in as close proximity to the pulling-rods $f$, $f'$, $f^2$, and $f^3$ and post L as the said rods will allow, thereby reducing the breaking strain to which the table H is subject, and consequently also reducing its size and weight.

In Figs. III and IV is shown the device for taking up as well as equalizing the thrust of the four screws or rods $f$, $f'$, $f^2$, and $f^3$ on the frame A and the pull in the cross-head I, Fig. I.

In the frame A that part Q' of same between the rods $f$ and $f'$, as well as Q$^2$ between $f^2$ and $f^3$, is made loose or removable to the depth of the step-bearing for the wheels K, K', K$^2$, and K$^3$. In the bottom, under each step, are placed rings $s$, of elastic but incompressible material, or nearly so, as rubber. Between two and two of said rings a loosely-fitted piece, $t$, is placed, and on top of same is secured the filling-in pieces Q' and Q$^2$, which must, however, not prevent the free motion endwise of pieces $t$. Now if, by reason of slack or otherwise, one of the screws should be subject to excessive strain more than the others, then the elastic ring which is subject to the greatest pressure will expand, pushing the piece $t$ against the least compressed ring and compress it still further until the pressure on both is equalized. This arrangement also distributes the pressure on the step evenly over its whole surface.

The steps of the wheels K, K', K$^2$, and K$^3$ are also provided with trains of friction-rollers $u$, placed between the steel plates $v$ and $v'$. A metal frame, $w$, Figs. V and VI, incloses, separates, and keeps the rollers in proper position. By separating the said rollers with their metal frame the rollers are prevented from being worn flat at intervals on their surface, as is often the case when the bearings are completely filled with rollers and one roll allowed to rub against the other, and thereby destroy the usefulness of the friction-rollers.

The diagram Fig. VII illustrates an arrangement in multiple series suitable for application to larger machines, specially those of the horizontal type, in which great power is usually required.

The series of screws above described is here quadrupled, there being four sets of screws, each consisting of four screws, $f$ $f'$ $f^2$ $f^3$, rotated by a central shaft carrying a pinion, O, meshing with gears K K' K$^2$ K$^3$ upon the several screws. The shafts of the pinions O O O O carry, respectively, gears J J' J$^2$ J$^3$, each of which meshes with a pinion, $j$, upon a central shaft, from which rotation is thus imparted to the sixteen screws of the series. The thrust of each of the two pairs of screws $f$ $f'$ and $f^2$ $f^3$ of each set is taken up on equalizing-bearings in the manner before described, and shown in Fig. III, and the combined thrust of each pair of sets is supported in a similar manner, four screws being equalized with four upon the same principle as one screw is with one in Fig. III. Power is transmitted to and through all the sixteen screws of the multiple series by the use of double gearing only, thus materially reducing the loss due to friction.

The beam G, Figs. I and II, is provided with a sliding weight or poise, S, which is moved along the beam by the screw T. Said screw will receive motion from the electric motor U, which is placed at the end of the beam G, the rotary motion from the motor U being communicated to the screw T through the pinion V and wheel V'. The face of the wheel V' is provided with divisions, and marked so as to indicate fractions of the weight added on the beam G by the movement of the poise S corresponding to one turn of the screw T, the weight added per turn of screw to be marked along the face of the beam G, the electrical connection for the motor to be done either by the operator or by the automatic motion of the beam, making connection on raising and disconnecting when lowering on reaching its lowest point, or other contact is made by which the current is reversed, and consequently the motion of the motor U and the poise S, the current of electricity to be obtained from a battery, X, or other sources of electricity, and conducted through properly placed wires to the motor, which is constructed on one or the other of the now well-known plans for such motors, and need not here be further specified.

The measuring-instrument W, Fig. I, the object and function of which are to accurately measure the amount of elongation or compression undergone by a specimen in the testing operation, is held in position at the lower end of test specimen N by the collar $y$, which is secured by screws to the specimen. On the upper end of specimen N another collar, $y'$, is secured. Between collar $y'$ and three or more pistons, $z$, in the measuring-instrument W are placed three or more corresponding screws, $z'$, which can be adjusted as to proper length by the nuts $z^2$. These nuts are provided with right and left handed threads for that purpose.

It is obvious that any elongation or compression to which the specimen N may be subjected will occasion a corresponding movement of the pistons $z$ in the instrument W, and such movement is graphically indicated upon a drum, Y, rotated by a device, Z, as presently to be described.

The pistons $z$, Figs. VIII and IX, (three or more in number,) are equally distributed around the specimen, so they will record the mean of any extension or compression.

The pistons $z$ are pressed out by springs $h'$, the limit for this motion being either the screws $z'$ (when in use) or the collar $i'$ at the lower ends of pistons $z$. Rings $i^2$ guide said pistons and keep them tight, so the fluid beneath cannot escape.

The spaces under the pistons $z$, as well as the passages $k'$, connecting said spaces and the tube $k^2$, are filled with mercury or other fluid which is a good conductor of electricity.

From the top of tube $k^2$, and down through said tube, passes the micrometer-screw $l'$. The nut $m'$ for same can be turned by the worm-wheel $n'$ and worm $n^2$, by which the screw is moved up and down, as the case may require. The screw $l'$ and nut for same, $m'$, are insulated from the body of W by the non-conducting rings $o'$ and $o^2$.

The worm-wheel $n'$ is made of non-conducting material, and is secured to the nut $m'$ of the screw $l'$, and to the under side of the worm-wheel are secured two metal rings, $p'$ and $p^2$. From said rings conducting-wires $q'$ and $q^2$ pass through the wheel $n'$, said wires to be equally distant apart on each ring, and the number of wires on the two rings to bear a fixed relation—say for the inner ring ten and for the outer ring one hundred—for the sake of ease in adjusting the other parts of the instrument.

The top of the wires $q'$ and $q^2$ will, when the wheel is turned, touch the downward extension of the binding-posts $s'$ and $s^2$, the binding-post $s'$ serving to make contact with the wires $q'$ of the ring $p'$, and the post $s^2$ similarly serving to make contact with the wires $q^2$ of the ring $p^2$.

Connection for the purpose of imparting movement to the rotating device Z of the recording-drum Y may be made either between the post $s^2$ and the post $s^{15}$, as shown, or between the post $s'$ and the post $s^{15}$, depending upon the degree of fineness or accuracy of measurement required, the functions of the two binding-posts $s'$ and $s^2$ being to enable the circuit of the battery $X^2$ to be closed, either through the coarsely-pitched wires of the inner ring, $p'$, or through the finely-pitched wires $q^2$ of the outer ring, $p^2$, as desired.

The tube $k^2$ is extended on one side by a rectangular slot, which is partly filled by the shoe $k^3$. With this shoe the instrument can be fully corrected, so as to give perfect measurement, as said shoe is adjustable so as to give any desired proportions between the pistons $z$ and tube $k^2$, and on its face next to the mercury any necessary correction of the micrometer-screw can be made.

An insulated wire, $s^4$, passes from the binding-screw $s^3$ through the center of the screw $l'$, the lower end of the wire $s^4$ being slightly above the lower end of the screw—say one-thousandth of an inch—that is to say, that when the mercury rises high enough in the tube $k^2$ to come in contact with the screw $l'$ it will be slightly out of contact with the wire $s^4$.

The electric current which is to pass through the screw $l'$ will pass off from the binding-screw $s^5$. The worm $n^2$ is operated by the electric motor $U'$, similar in construction to U on the beam G.

In order to enable the motor $U'$ to turn the worm $n^2$ in both directions, an automatic current-changing switch, $t'$, and electro-magnet $t^2$ are used in such a way that when no current is passing through the wire of the electro-magnet $t^2$ the switch, which turns on the pivot $c^2$ by the spring $t^3$, is brought in contact with binding-post $s^6$. The circuit is thus closed for battery X' through post $s^6$, post $s^7$ on switch $t'$, post $s^8$, the motor U', and post $s^9$, back to said battery. Said current and consequent motion of the motor will occur when no contact takes place between the mercury and the micrometer-screw $l'$. When the current which enters the instrument from battery X' by the binding-post $s^{10}$ can pass through the screw $l'$ by being brought in contact with the mercury in the instrument, it will pass off from binding-screw $s^5$ through the wire of the electro-magnet $t^2$ and back to said battery. It is obvious that the switch $t'$ is attracted by said electro-magnet and contact between posts $s^6$ and $s^7$ broken. In this position of said switch no current is passing through the motor U', and the worm $w^2$ will not move. Further, if the mercury is brought still higher in the instrument, contact by said mercury is made by the wire $s^4$ in the center of screw $l'$, part of the current will pass off through this wire, through binding-post $s^3$, binding-post $s^{11}$, the motor U', and off by post $s^9$ to battery X', producing a reverse motion of said motor and worm $w^2$ to that first obtained for same and described above.

On beam G, Fig. I, is located the cylindrical drum Y, on which paper for the graphical record or strain-diagram is attached. Y' is the holder and pencil with which the diagram is drawn. Said holder is placed on the screw T, which, on this part, has screw-thread of such a pitch that the holder, which is fitted on said screw, will move the length of the drum Y with the same number of turns that will move the poise S the length of the space provided for it on beam G, so that a certain longitudinal movement of the pencil on the drum Y will indicate a certain amount of strain brought to bear on specimen tested.

At Z is a device for giving rotary motion to the drum Y, a certain amount of rotary motion of drum Y to correspond to a certain amount of elongation or compression of the specimen, as the case may be.

The details of this device are shown in Figs. X and XI, which are respectively longitudinal and transverse sections, and the device consists, in substance, of a casing containing a central shaft, two ratchet-wheels secured thereon, a double pawl and lever, and two electro-magnets, and provided with binding-posts for the connection of battery-wires.

The axle $r^2$ of drum Y passes through the center of the casing of Z. On said axle are secured two ratchet-wheels, $r^3$ and $r^4$, with teeth on $r^3$ to the right and on $r^4$ to the left. Between the ratchet-wheels is located the electro-magnet $r^5$. On the axle $r^2$ is hinged the soft-iron armature $r^6$, which is held back from the magnet by the spring $r^7$. Inclosed at its upper ends by said armature is located the double pawl and lever $r^8$, which is pivoted at $r^9$. At the lower end of said lever is placed the electro-magnet $r^{10}$, between which and lever $r^8$ is a spring, $r^{11}$, by which said lever will engage wheel $r^4$ when no current passes around the magnet $r^{10}$. If the current is reversed and made to pass around magnet $r^{10}$, the lever $r^8$ will be attracted by said magnet, and in this position engage with the ratchet-wheel $r^3$.

By this device it is obvious that if a current enters by binding-post $s^{12}$ it will pass around the electro-magnet $r^5$ and off by binding-post $s^{13}$. The pawl $r^8$ will be moved by said magnet and its armature $r^6$, and move drum Y by the ratchet-wheel $r^4$ to the right. The reverse will take place if the current enters binding-post $s^{14}$ and passes around $r^{10}$, hence to and around $r^5$, and off by post $s^{13}$, the lever $r^8$ being moved by $r^{10}$ from its first position to its second, and engaging with ratchet-wheel $r^3$.

The operation of the measuring-instrument in connection with the turning device Z for drum Y, Figs. VIII to XI, will be as follows: When, by reason of extension or compression of a specimen, the worm-wheel $w'$, in the way and manner above described, is turned so as to make contact either between the wires $q'$ and the binding-post $s'$ or between the wires $q^2$ and the binding-post $s^2$, a current of electricity from the battery $X^2$ will pass, in the first case, to the ring $p'$, and thence by the wire $q'$ to the binding-post $s'$, or, in the second case, will pass to the ring $p^2$, and thence by the wire $q^2$ to the binding-post $s^2$, depending upon whether the wires $q'$ or $q^2$ close the circuit.

In Fig. VIII connection is shown from post $s^2$ to binding-post $s^{15}$ on the switch $t'$ and post $s^{16}$. By said connection the current is passed to post $s^{14}$, Fig. XI, through the turning device Z, and by post $s^{13}$ to battery $X^2$. This movement of the current will turn the drum Y to the left, as above described. If, however, the switch $t'$ changes position and disconnects posts $s^{15}$ and $s^{16}$ and connects posts $s^{15}$ and $s^{17}$, as will take place when the current from battery X' is passing around electro-magnet $t^2$, as above described, it is obvious that the current from battery $X^2$ will pass off from binding-post $s^{13}$ to $s^{12}$, hence through Z, and from post $s^{12}$ back to battery $X^2$, and by this movement turn the drum Y to the right, as above described.

The operation of the machine will be, for tensile test, as follows: The measuring-instrument is first secured to the specimen in proper position. The specimen is next secured in the machine, as shown, Fig. I. A sheet of paper is secured around the drum Y, which may be lined lengthwise and crosswise, either before or after the line or diagram is traced by the instrument, so that extension and stress to which the specimen has been subjected can be easily read and the general character of the material observed. The poise S and pencil Y' are moved to zero and the beam is balanced. The connections between motor U and battery X, the motor U' and battery X', also between the turning device Z and battery $X^2$, are now made. The machine is now ready to apply the strain on the specimen, which is done by the pulley or hand-wheel m through the different gearings, and by the screws f, f', f², and f³, as described. The strain will bear upon the main levers B, C, and D, and be communicated from same, through the intermediate lever F, to weight-beam G, on which the record and diagram of the test are made. The increase of stress will cause the poise S and the pencil Y to be moved longitudinally on drum Y, and the extension of the specimen will cause a rotary motion to the drum Y. In this manner a curve will be traced on the drum, in which the extension will be the abscissa and the strain the co-ordinate to any point in the curve. The area inclosed and general character of the curve will illustrate the quality of the material tested.

In making compression tests the specimen is placed on the table H and compressed by forcing cross-head I down on top of same. The balance of the manipulation is the same as for tensile tests.

I will here state that it is not absolutely necessary that the drum Y, turning device Z, and pencil-holder Y' should form part of the beam, only that it is most convenient so to place them. They may form a separate instrument, in which, however, the longitudinal motion of the pencil Y', derived from the screw T, must be made by an instrument, like or similar to Z, for that purpose, but controlled in its actions by the motion of the poise S on the beam.

What I claim, and that for which I desire Letters Patent, is—

1. The combination, in a testing-machine, of a supporting-frame, three main levers supported on pivot-edges on said frame, a table supported on pivot-edges on said main levers and carrying a cross-head for the reception of one end of a specimen to be tested, and four pulling or straining rods carrying a cross-head for the reception of the opposite end of the specimen, the pivot-edges of the main levers and table being located adjacent to the axes of the pulling-rods and disposed on opposite sides of two longitudinal center lines adjacent thereto, substantially as set forth.

2. The combination, in a testing-machine, of a supporting-frame, a movable table for carrying the specimen to be tested, and spring-checks limiting the traverse of the movable table, substantially as and for the purpose set forth.

3. The combination, in a testing-machine, of a series of threaded rods by which power is applied to a specimen to be tested, a series of nuts, each having a gear-wheel formed or secured upon it and engaging the thread of one of said rods, and a common driving-shaft and pinion by which said nuts are rotated, substantially as set forth.

4. The combination, in a testing-machine, of a central driving-shaft and pinion, a series of gear-wheels, each meshing with said pinion and carrying a nut engaging a threaded pulling-rod, two bevel-pinions, each mounted loosely upon the central driving-shaft, and a bevel-gear of larger diameter fixed thereon, a counter-shaft carrying a driving-pulley, a fixed bevel-pinion meshing with the loose pinions of the central shaft, and a loose bevel-pinion meshing with the fixed gear of said shaft, a clutch by which either of the loose pinions of the driving-shaft may be made fast thereon, and a clutch by which the loose pinion of the counter-shaft may be made fast thereon, these members being combined for joint operation to impart motion from the counter-shaft to the central driving-shaft in either direction, or at different rates of speed in the same direction, substantially as set forth.

5. The combination, in a testing-machine, of four straining or pulling rods arranged equidistantly in pairs, an elastic but comparatively incompressible medium surrounding and receiving the strain applied to each rod, and a movable equalizing-piece, by which excess of strain applied to one rod of each pair is transmitted to the other and the strain equalized between the two, substantially as set forth.

6. The combination, in a testing-machine, of four threaded straining or pulling rods arranged in pairs in a supporting-frame, nuts engaging each of said rods, each nut having a gear-wheel formed upon it, a bracket supporting each of said nuts and guiding its rod, elastic rings receiving the strain applied to each of said rods, two movable plates, each interposed between the elastic rings of one pair of rods, and two fitting-pieces, each of which is interposed between the nuts of a pair of rods and holds the movable plate thereof in position, substantially as set forth.

7. The combination, in a testing-machine, of a threaded pulling-rod, an elastic ring through which strain applied to the pulling-rod is transmitted to its supporting-frame, two metal plates encircling said rod, one of which bears against its elastic ring and the other against the nut by which it is operated, a series of friction-rollers interposed between the two metal plates, and a frame by which the rollers are separated one from the other and maintained in proper relative position, substantially as set forth.

8. The combination, in a testing-machine, of a multiple series of pulling-rods, consisting of four sets of four each, the rods of each set being operated by a central pinion meshing with gears moving the several rods, and having their bearings equalized, as described, a central shaft and pinion operating gears upon the shafts of the driving-pinions of each of the four sets of rods, and a device for equalizing the applied strains from one set of rods to another, substantially as set forth.

9. The combination, in a testing-mechine, of a weighing-beam, a weight or poise sliding on said beam, and an electric motor by which longitudinal movement upon the beam is imparted to the poise, substantially as set forth.

10. The combination, in a testing-machine, of a weighing-beam, a weight or poise mounted upon and having the capacity of longitudinal movement upon said beam, a screw mounted in bearings upon said beam and engaging a nut on the weight or poise, and gearing by which said screw is rotated from an electric motor, these members being combined for joint operation substantially as and for the purpose set forth.

11. The combination, in a testing-machine, of a specimen-holder, a vessel containing a fluid medium, acting as an indicator of the extension or compression of the test specimen, and a piston or pistons by which the effect of the strain applied to the specimen-holder and specimen is transmitted to the fluid medium, substantially as set forth.

12. The combination, in a testing-machine, of a vessel containing a liquid medium, a series of pistons resting upon said liquid medium, and adjustable connections uniting said pistons with a collar to which the test specimen is to be connected, substantially as set forth.

13. The combination, with a testing-machine, of a measuring-instrument embodying a vessel containing a liquid medium which is a conductor of electricity, a series of pistons supported on springs and resting on said liquid medium, a micrometer-screw, the lower end of which may be brought into contact with said liquid medium, and which has an internal insulated wire terminating a short distance above its lower end, a nut engaging the thread of said micrometer-screw and carrying a worm-wheel, two non-conducting rings which insulate the micrometer-screw and nut from the vessel containing the liquid medium, binding-posts connected respectively with the micrometer-screw and its internal insulated wire, a battery and electric motor by which the worm and worm-wheel are rotated, and an electro-magnet and switch for reversing the direction of such rotation, these members being combined for joint operation substantially as set forth.

14. The combination, in a measuring device for testing-machines, of a vessel containing a liquid medium, a vertical tube communicating with said vessel and having a slot in one of its sides, a micrometer-screw working in said tube, and an adjustable shoe fitting in the slot of said tube and serving to vary the sectional area of the tube to compensate for irregularities in the tube or micrometer-screw, or both, substantially as set forth.

15. The combination, in a testing-machine, of a weighing-beam, a sliding weight or poise indicating the strain applied to the test specimen, and a device for graphically recording the extension or compression of the specimen under the applied strain, substantially as set forth.

16. The combination, in a testing-machine, of a weighing-beam, a recording-drum, and a longitudinal screw, each rotating in bearings thereon, and a pencil-holder traversing the screw parallel with the axis of the recording-drum, substantially as set forth.

17. The combination, in a testing-machine, of a measuring-instrument, a recording-drum, a battery, and a device for rotating the drum by the action of the battery, these members being combined for joint operation substantially as and for the purpose set forth.

TINIUS OLSEN.

Witnesses:
CHR. ENCKE,
C. Y. OLSEN.